Figure 6:
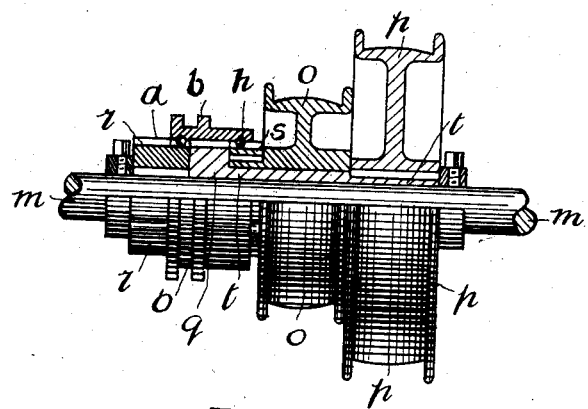

L. WIRTZ.
CLUTCH.
APPLICATION FILED APR. 11, 1908.
901,408.
Patented Oct. 20, 1908.
2 SHEETS—SHEET 1.
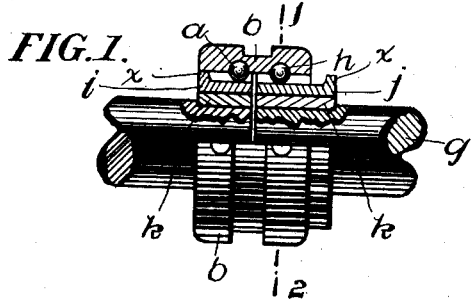
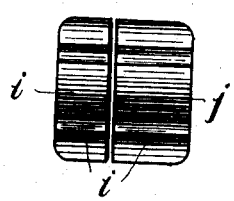
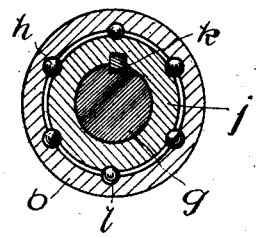
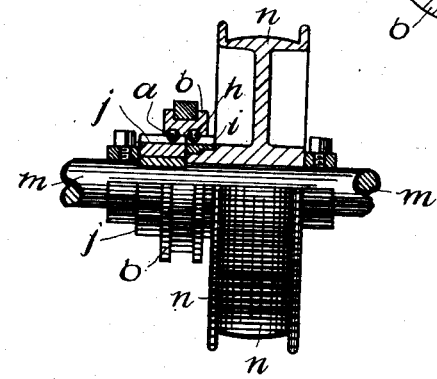
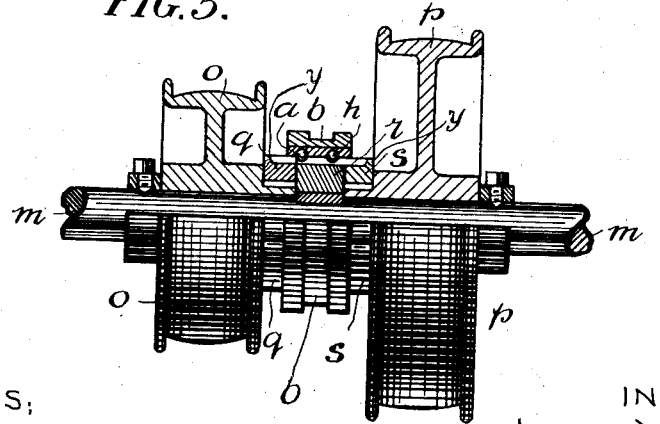
WITNESSES:
INVENTOR,
LUIS WIRTZ,
by
van Orderweed & Schoenlank
Attorneys.

L. WIRTZ.
CLUTCH.
APPLICATION FILED APR. 11, 1908.

901,408.

Patented Oct. 20, 1908.
2 SHEETS—SHEET 2.

WITNESSES:

INVENTOR,
LUIS WIRTZ,
by van Oldeneel & Schoenlank
Attorneys.

UNITED STATES PATENT OFFICE.

LUIS WIRTZ, OF BILSTON, ENGLAND.

CLUTCH.

No. 901,408.  Specification of Letters Patent.  Patented Oct. 20, 1908.

Application filed April 11, 1908. Serial No. 426,588.

*To all whom it may concern:*

Be it known that I, LUIS WIRTZ, a subject of the King of Great Britain, residing at Studley House, Bilston, in the county of Stafford, England, have invented certain new and useful Improvements in Clutches, of which the following is a specification.

This invention has for its object to provide easy means of engaging and disengaging rotatable members in any class of mechanism. To this end I employ as the coupling means, a plurality of rings of loose balls, one half of each ball being permanently engaged a plurality of rings of loose balls, one half of each ball acting as an engaging or disengaging dog or clutching member in conjunction with longitudinal grooves or flutes formed on or without the shaft sleeve or other object or objects to be coupled or disconnected. The balls which form the coupling element may be several in number according to the strength required, and one or the other of the rings of balls should be always in positive connection with one of the elements to be coupled. The balls may however be moved along the grooves or notches, in say a central member to connect with members either to the right or left of it, as will be hereafter more particularly explained, and in this case, when moving in one direction, one ring of balls (if two only are used) remains in engagement with the central member and one moves off that member to engage the adjacent member; in the opposite direction the same result is achieved, but a different ring of balls remains in engagement with the central element.

The arrangement of the balls and the means for forming a positive connection to one or other element may vary according to any particular adaptation of the invention, but always loose balls are used permanently housed to approximately half their diameter in pockets in a carrier always leaving a projecting half for forming a dog or clutch for acting in coöperation with longitudinal grooves or flutes.

The clutch may be used on machines with automatic operation, that is to say the rise and fall of a plunger or like moving part may effect the movement of the sliding ring, conveying the balls to effect the coupling or uncoupling of certain shafts on the machine. In this connection one ring of balls may be always locked and the other may be moved alternately between projections on, and onto plain parts of the shaft to successively drive or stop a shaft by one stroke of the operating mechanism.

The application of the ball to clutches which is the subject of this invention is quite distinct from previous applications where a row of balls have been used as a frictionless key to lock a gear wheel or other part to the shaft, or where balls have been arranged free in a larger perforation in a hollow shaft and forced practically out of same to engage a similar perforation and thus lock any loose mechanism to a shaft by the operation of a plunger on a rod working in the hollow shaft. In these cases there is no slidable ball forming a frictionless clutch member and also a bearing for the shifting carrier or part of the clutch which is the case with the present invention, but the ball simply acts as a single key.

With this invention I have the new effect of a ball connection of the parts to be coupled and the advantage of a most free and easy operation to couple one or other of the members, the actual clutching element serves as a frictionless bearing for the coupling and operating ring so that while actual connection is being made the connecting elements themselves provide for a very smooth movement of the operating part. Ease of operation is thus the feature of the device.

In order that the invention may be clearly understood and easily carried into practice, I have appended hereunto two sheets of drawings showing examples of the clutch in practice.

Figure 7:
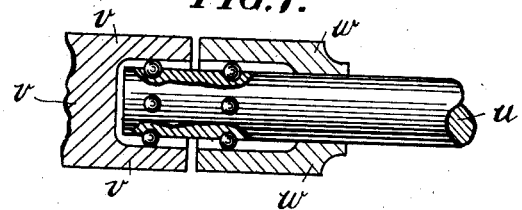
Figure 8:
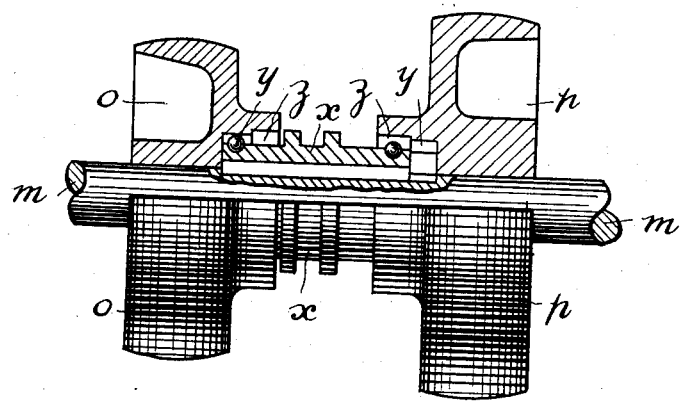

Figure 1 is a part sectional elevation of the invention, showing a preferable form. Fig. 2 is a view of the grooved or fluted parts used in Fig. 1. Fig. 3 is a section on line 1—2 of Fig. 1. Fig. 4, shows an arrangement for coupling or freeing a pulley to or from the shaft. Fig. 5, is a part sectional elevation showing the clutch applied on a shaft between two adjacent pulleys for coupling either to the shaft. Fig. 6, is a similar view to Fig. 5, but showing the clutch at the side of the pulleys one pulley being on a sleeve so that the clutch can couple either to the shaft. Fig. 7, is a view showing the simplest application of the invention when the balls are carried internally. Fig. 8, is a more elaborate application of the internal carrying principle showing the invention arranged for clutching either of two pulleys or the like to a shaft.

In the arrangement shown at Fig. 1, one ring of balls $a$, is arranged between one end of a pocketed ring or carrier $b$, and the grooved boss or part $i$, keyed at $k$, on the shaft $d$. The pocketed ring or carrier $b$, has at its other end a ring of balls which engage grooves in the boss $j$, keyed on the other shaft $g$. The carrier is permanently locked by balls $h$, to the shaft $g$, and may be moved entirely onto the boss $j$, of this shaft, as the grooves of this boss are longer than those of the boss $i$, on the shaft $d$, and can accommodate the ring of balls $a$, and the ring of balls $h$. To couple the shafts $d$, and $g$, the carrier $b$, is moved by an ordinary shifting device to cause the balls $a$, to leave the grooves of the boss $j$, and pass into those of the boss $i$, on the shaft $d$, as shown at Fig. 1; the shafts are then coupled.

The balls $h$, are housed in pockets in the carrier $b$, in the same manner as the balls $a$; half of each ball being in the pocket and half projecting to form a dog or clutch part. The balls, in all cases, are quite freely mounted in the pockets. The collars $i$ and $j$ answer to bosses, and are provided with grooves $l$, Fig. 2, semi-circular in cross section, along which the balls $a$, $h$, work when the carrier is moved. The grooves in the collars may end (as shown at X) just short of the edge, to limit the movement of the carrier $b$, or a limiting device may be provided on the shifting lever for this purpose.

The clutch in Figs. 1 and 3 operates very smoothly in its action, and is therefore very desirable.

Fig. 4, is a simple case where one pulley has to be locked on the shaft. Two grooved collars $i$, and $j$, are employed as before, but one $j$, the larger one is keyed to the shaft $m$, and the other $i$, is connected to the pulley $m$. The ball rings $a$, and $h$, in the carrier $b$, are normally on the grooved collar $j$, the pulley then being free; to lock the pulley the carrier $b$, is moved and the ring of balls $h$, leaves the collar $j$, and passes onto the collar $i$, connected to the pulley, thereby locking the same to the shaft.

In the arrangement shown at Fig. 5, the carrier $b$, with the balls $a$, and $h$, are used to couple either of two pulleys $o$, and $p$, to the shaft $m$. In this arrangement three grooved collars $q$, $r$, $s$, are used, the middle one $r$, being keyed to the shaft while the others $q$ and $s$, are connected to the pulleys $o$, and $p$, which may be forward and reverse drives respectively. The collar $r$, which is keyed to the shaft has the ball grooves carried right across its periphery as shown, but the collars $q$, and $s$, on the pulleys may (as shown at $y$, $y$,) only be grooved a short distance in toward the pulley. The pocketed ring or carrier $b$, has the usual fork groove, in which a shifting fork provided with bearing slippers in the usual way sits so that the ring may readily be shifted to either side of the central position shown, by operating the lever controlling the fork. By thus shifting the carrier $b$, owing to the balls being arranged in hemi-spherical pockets therein, the rings $a$, $h$, are shifted along the grooves in the central collar $r$, and according to the direction of the movement, one or other of the rings of balls are carried off the collar $r$, into the collar $q$, or $s$. The other ring remains on the collar $r$, and thus the latter is coupled to one or other of the collars $q$, $s$, and pulleys $o$, $p$. It is impossible for the carrier $b$, and both its ball rings to be moved from the collar $r$, as the extremities of the grooves in the adjacent collars $q$, $s$, would prevent the further movement of one of the rings of balls. The same effect can be obtained by limiting the stroke of the operating fork. It will be seen that with this arrangement a free position is obtained which is the position illustrated.

At Fig. 6, the clutch is shown locking the small pulley $o$, to the shaft $m$, in this case the fast collar $r$, is outside the pulley collars $q$, and $s$, and the grooves may or may not extend right across its periphery. The collar $q$, is integral with or secured to a sleeve $t$, loosely mounted on the shaft $m$, and on this sleeve the pulley $p$, is keyed. The pulley $o$, is connected to the collar $s$. In this case the ring $a$, of balls never leaves the fast collar $r$, but the ring $h$, travels from $r$, over the collar $q$, and also to the collar $s$, so that either of these may be clutched to the fast collar $r$, as before.

At Fig. 7, the balls are arranged in pockets in the outside of a shiftable part $u$, and may be moved to engage flutes or grooves in the part to be coupled $v$, as shown or withdrawn into the part $w$, to free the part $v$.

At Fig. 8, the balls are mounted in a hollow carrier $x$, slidable on a key along the shaft $m$. Around the shaft and carrier are the pulleys $o$, and $p$, with bosses which are fluted for a part of the length of the boss as at $y$, but plain at the entry $z$. Thus by movement of the carrier $x$, one or other of the pulleys $o$, and $p$, may be clutched to the shaft. The drawing shows the pulley $o$, being driven and $p$, loose.

What I claim then is:

1. In combination with elements to be coupled, a clutch comprising a slidable carrier provided with two rings of balls forming a coupling medium, one of said rings being constantly in engagement with one of the elements to be coupled, and the other ring of balls being movable into and out of engagement with the other of said elements.

2. In combination with elements to be coupled, a clutch comprising a slidable carrier provided with two rings of balls permanently carried thereby, one of said rings being constantly in engagement with one of the elements to be coupled, and the other ring of balls being movable into engagement with either of said elements.

3. In combination with elements to be coupled, and one of which is provided with grooves, a clutch comprising two rings of balls one of which slidably fits the grooves aforesaid and is movable into and out of the grooves mentioned.

4. In combination with elements to be coupled and each provided with grooves, a clutch comprising a slidable carrier having two rings of pockets, and balls permanently fitting within the pockets and slidably fitting the grooves aforesaid.

5. In combination, two shafts to be coupled and each provided with bosses having external longitudinal grooves, with a clutch comprising a sleeve slidable upon said bosses and having two internal rings of pockets and balls permanently fitting within the pockets and slidably fitting the aforesaid grooves of the bosses.

6. In combination with a member and a member to be coupled with the former, a clutch in constant slidable engagement with the first-named member, and comprising a part provided with two rings of balls permanently carried thereby and one of which rings is movable into and out of engagement with the second-named member.

In testimony whereof, the said LUIS WIRTZ has signed his name to this specification in the presence of two subscribing witnesses, this 23rd day of March 1908.

LUIS WIRTZ.

Witnesses:
F. GILBERT BRETTELL,
STANLEY BANNER.